(12) United States Patent
Yu et al.

(10) Patent No.: US 10,418,135 B2
(45) Date of Patent: Sep. 17, 2019

(54) BOTTOM NOZZLE AND LIGHT-WATER REACTOR FUEL ASSEMBLY

(71) Applicants: China Nuclear Power Technology Research Institute Co., Ltd, Shenzhen (CN); China General Nuclear Power Co., Ltd, Shenzhen (CN)

(72) Inventors: Wenchi Yu, Shenzhen (CN); Weicai Li, Shenzhen (CN); Haixiang Hu, Shenzhen (CN); Jiayuan Wang, Shenzhen (CN)

(73) Assignees: CHINA NUCLEAR POWER TECHNOLOGY RESEARCH INSTITUTE CO., LTD, Shenzhen (CN); CHINA GENERAL NUCLEAR POWER CO., LTD, Shenzhen (CN)

( * ) Notice: Subject to any disclaimer, the term of this patent is extended or adjusted under 35 U.S.C. 154(b) by 581 days.

(21) Appl. No.: 15/187,176

(22) PCT Filed: Dec. 20, 2013

(86) PCT No.: PCT/CN2013/090130
§ 371 (c)(1),
(2) Date: Jun. 20, 2016

(87) PCT Pub. No.: WO2015/089835
PCT Pub. Date: Jun. 25, 2015

(65) Prior Publication Data
US 2016/0336080 A1 Nov. 17, 2016

(51) Int. Cl.
*G21C 3/33* (2006.01)
*G21C 3/32* (2006.01)

(52) U.S. Cl.
CPC .............. *G21C 3/3206* (2013.01); *G21C 3/32* (2013.01); *G21C 3/3305* (2013.01); *Y02E 30/40* (2013.01)

(58) Field of Classification Search
CPC ...... G21C 3/3305; G21C 3/3206; G21C 3/32; G21C 3/00
See application file for complete search history.

(56) References Cited

U.S. PATENT DOCUMENTS 4,828,791 A     5/1989  DeMario
5,030,412 A *   7/1991  Yates ................... G21C 3/3206
                                                         376/313

(Continued)

FOREIGN PATENT DOCUMENTS

CN          102651243 A      8/2012
CN          102750990 A     10/2012

(Continued)

*Primary Examiner* — Lily C Garner
(74) *Attorney, Agent, or Firm* — Shimokaji IP (57) ABSTRACT

A bottom nozzle includes a skirt, support blocks, transverse blades and longitudinal blades. The skirt is a hollow structure and a bottom thereof is provided with corner legs which are protruded downwards, a cavity is defined in the hollow structure, the transverse blades are configured in the cavity, the longitudinal blades are configured in the cavity, the transverse blades and longitudinal blades are firmly connected with the skirt, projections of the transverse blades and the longitudinal blades in a level plane are intersectant to form interleaved grids, and the support blocks run through and are fixed on the transverse blades and the longitudinal blades. In such a way, the bottom nozzle forms a three-dimensional gridded water passage, thereby improving the filter capacity and generating small water pressure drop.

14 Claims, 10 Drawing Sheets

(56) References Cited

U.S. PATENT DOCUMENTS

| | | | |
|---|---|---|---|
| 5,361,287 A | 11/1994 | Williamson | |
| 5,390,220 A * | 2/1995 | Zuloaga, Jr. | G21C 3/3206 |
| | | | 376/313 |
| 7,149,272 B2 * | 12/2006 | Soderlund | G21C 3/322 |
| | | | 376/310 |

FOREIGN PATENT DOCUMENTS

| | | | |
|---|---|---|---|
| CN | 102750991 A | | 10/2012 |
| CN | 202887743 U | * | 4/2013 |
| JP | H0634780 A | * | 2/1994 |

* cited by examiner

BOTTOM NOZZLE AND LIGHT-WATER REACTOR FUEL ASSEMBLY

FIELD OF THE INVENTION

The present invention relates to light-water reactor components, and more particularly to a light-water reactor fuel assembly and a bottom nozzle thereof.

BACKGROUND OF THE INVENTION

Fuel rods with certain amount arranged in a predetermined spacing (such as 15×15, 17×17.etc.) and formed to a bunch are called as a nuclear reactor fuel assembly which mainly includes a nozzle, a top nozzle, a bottom nozzle, spacer grids, guide thimbles and fuel rods. A conventional nuclear reactor fuel assembly will be maintained in the nuclear reactor for 3~5 years under a rigorous operation condition, since it is placed in a strong neutron field and must suffer high temperature, high pressure, and strong scouring of high-speed coolant flow, and suffer chemistry action of fission products and complex mechanical loads meanwhile.

As well known, the main intention of the multiple protections for the nuclear reactor is to prevent large quantity of radioactive substances from being leaked out from the nuclear reactor once explosion accidents of nuclear reactor happen. While the important factors for preventing explosion accidents are to control the speed and the temperature of the chain reaction in the nuclear reaction, thus the water flow control of the light water in the fuel assembly that is acted as moderator and coolant is critical, and the structure of the bottom nozzle of the fuel assembly is quite important to the water flux control of the light water. Specifically, the bottom nozzle is required to configure a skirt matching with spacer grids on which fuel rods are placed, and the skirt is provided with flow holes to allow the light water to flow, such flow holes must be sufficient and have enough strength to suffer the weight of the spacer grids and the scouring of the high-speed water flow. In addition, the flow holes must be sized to filter the foreign substance in the light water.

A skirt of a conventional bottom nozzle is provided with multiple flow holes and connecting holes, and predetermined spacing must be formed among the holes to make the skirt have enough strength, as a result, most entity area of the skirt may obstruct a part of water flowing through the bottom nozzle, thus the water speed after water flow passing through the bottom nozzle is reduced, as a result, large water pressure drop is generated, which may cause accidents of nuclear reactor. Note, the water flow direction is from down to up, namely from the lower end of the bottom nozzle to the upper end thereof.

Thus, there is a need to provide an improved bottom nozzle that has improved filter capacity and generates smaller water pressure drop.

SUMMARY OF THE INVENTION

One objective of the present invention is to provide a bottom nozzle that has improved filter capability and generates small water pressure drop.

Another objective of the present invention is to provide a light-water reactor fuel assembly including a bottom nozzle that has improved filter capability and generates small water pressure drop.

To achieve the above-mentioned objectives, a bottom nozzle includes a skirt, support blocks, transverse blades and longitudinal blades. The skirt is a hollow structure and a bottom thereof is provided with corner legs which are protruded downwards, a cavity is defined in the hollow structure, the transverse blades are equidistantly and uniformly configured in the cavity to form a transverse thin strip layer, the longitudinal blades are equidistantly and uniformly configured in the cavity to form a longitudinal thin strip layer, both ends of the transverse blades and longitudinal blades are firmly connected with the skirt, the transverse blades are located above longitudinal blades, projections of the transverse blades and the longitudinal blades in a level plane are intersectant to form interleaved grids, and the support blocks run through and are fixed on the transverse blades and the longitudinal blades.

Preferably, lower ends of the transverse blades are connected to upper ends of the longitudinal blades, so as to improve the strength of the bottom nozzle, thereby maintaining a stable running state and a normal and safe running when the bottom nozzle suffers the weight of the spacer grids and the scouring of the high-speed water flow.

Preferably, a gap is formed between the lower ends of the transverse blades and the upper ends of the longitudinal blades to form a water passage subdivision layer, thus the transverse blades and the longitudinal blades are arranged without contact one another, in such a way, a three-layer water passage is formed in the bottom nozzle, the three layers are the longitudinal water passage layers, the water passage subdivision layer, and the transverse water passage layers. Specifically, multiple longitudinal blades uniformly arranged form the longitudinal blades layer, and the spacing between two adjacent longitudinal blades forms one of the longitudinal water passage layers; similarly, multiple transverse blades uniformly arranged form the transverse blades layer, and the spacing between two adjacent transverse blades forms one of the transverse water passage layers. Water flow firstly passes through the longitudinal water passage layers to go into the water passage subdivision layer, and then goes into the transverse water passage layers, finally goes into the spacer grids. The three layers of water passage are communicated with each other to improve the filter capacity of the bottom nozzle 100, and the water flow will suffer less resistance so that the pressure drop becomes small when the water flow passes through the bottom nozzle 100. In addition, since the water passage subdivision layer is formed by the gap between the transverse blades and the longitudinal blades, namely there is no substance part in the water passage subdivision layer, thus the flow of the water through the water passage subdivision layer is smooth without obstruction, thereby greatly reducing the water pressure drop and ensuring the normal running of the nuclear reaction.

Preferably, the support blocks are located at intersections of the grids, to connect the transverse blades with the longitudinal blades to form a unity so as to improve the strength of the bottom nozzle, thereby maintaining a stable running state and a normal and safe running when the bottom nozzle suffers the weight of the spacer grids and the scouring of the high-speed water flow.

Preferably, the support blocks, the transverse blades and the longitudinal blades are in an integrated structure, thereby simplifying the structure and facilitating the manufacture thereof.

Preferably, projections of the transverse blades and longitudinal blades in a level plane are orthogonal.

Preferably, the transverse blades and longitudinal blades are in wave structures, and wave crests of the transverse blades are corresponding with wave crests of the longitudinal blades. In other words, the wave troughs of the transverse blades are corresponding with wave troughs of the longitudinal blades, thus a water passage is formed between the wave troughs, so that the water flow will suffer less resistance, and the pressure drop becomes small when the water flows through the bottom nozzle.

Preferably, an enhanced strip is connected between each support block and its adjacent transverse thin strip, or between each support block and its adjacent longitudinal thin strip. By means of the enhance strip, the three adjacent transverse blades or longitudinal blades are further connected together, so as to further improve the strength of the bottom nozzle, thereby maintaining a stable running state and a normal and safe running when the bottom nozzle suffers the weight of the spacer grids and the scouring of the high-speed water flow.

Preferably, the support blocks are provided with connecting holes whereby guide thimbles of a light-water reactor fuel assembly are amounted, and the connecting holes are stepped holes each of which has a narrow top and a wider bottom.

A light-water reactor fuel assembly includes a bottom nozzle, a top nozzle, spacer grids, guide thimbles and fuel rods, the fuel rods and the guide thimbles are inserted into the spacer grids respectively, the spacer grids have upper ends connected and mating with the top nozzle and lower ends connected and mating with the bottom nozzle. The bottom nozzle includes a skirt, support blocks, transverse blades and longitudinal blades. The skirt is a hollow structure and a bottom thereof is provided with corner legs which are protruded downwards, a cavity is defined in the hollow structure, the transverse blades are equidistantly and uniformly configured in the cavity to form a transverse thin strip layer, the longitudinal blades are equidistantly and uniformly configured in the cavity to form a longitudinal thin strip layer, both ends of the transverse blades and longitudinal blades are firmly connected with the skirt, the transverse blades are located above longitudinal blades, projections of the transverse blades and the longitudinal blades in a level plane are intersectant to form interleaved grids, and the support blocks run through and are fixed on the transverse blades and the longitudinal blades.

In comparison with the prior art, since the skirt of the bottom nozzle and the light-water reactor fuel assembly is a hollow structure and a bottom of the skirt is provided with corner legs which are protruded downwards, a cavity is defined in the hollow structure, the transverse blades are equidistantly and uniformly configured in the cavity to form a transverse thin strip layer, the longitudinal blades are equidistantly and uniformly configured in the cavity to form a longitudinal thin strip layer, both ends of the transverse blades and longitudinal blades are firmly connected with the skirt, the transverse blades are located above longitudinal blades, and projections of the transverse blades and the longitudinal blades in a level plane are intersectant to form interleaved grids, so that a three-dimensional and gridded water passage is formed in the bottom nozzle, namely the longitudinal water passage layers and the transverse water passage layers. Specifically, the longitudinal thin strip layer is formed by multiple longitudinal blades uniformly arranged, and the spacing between adjacent longitudinal blades forms the longitudinal water passage layers; similarly, the transverse thin strip layer is formed by multiple transverse blades uniformly arranged, and the spacing between adjacent transverse blades forms the transverse water passage layers. Both of the longitudinal water passage layers and the transverse water passage layers are shaped as strip grooves, since the both are not in the same plane, but interleaved spatially, thus forming such a three-dimensional and gridded water passage. The water flows from the longitudinal water passage layers to the transverse water passage layers, and flows to the spacer grids finally. When water passes through the longitudinal water passage layers, the water pressure drop is reduced due to less obstructions (only the transverse blades) present in the layer, so that the water flow will suffer less resistance, the pressure drop becomes small when the water flows through the bottom nozzle. In addition, since the transverse blades and longitudinal blades in three-dimensional grids are located in the skirt, thereby the support strength of the bottom nozzle are enhanced, and the running state of the bottom nozzle are stable even it suffers the weight of the spacer grids and the scouring of the high-speed water flow, which ensures the normal and safe operation of the nuclear reaction. Meanwhile, the three-dimensional and gridded water passage formed by the transverse blades and longitudinal blades can obstruct the foreign substance in the water flow and make it stay in the longitudinal water passage layers, thus no foreign substance flows into the transverse water passage layers and goes into the spacer grids to ensure the normal running. Further, the foreign substance is stayed in the longitudinal water passage layers, thus the foreign substance can not float freely to disturb the normal running.

DETAILED DESCRIPTION OF ILLUSTRATED EMBODIMENTS

Various preferred embodiments of the invention will now be described with reference to the figures, wherein like reference numerals designate similar parts throughout the various views.

Figure 1:
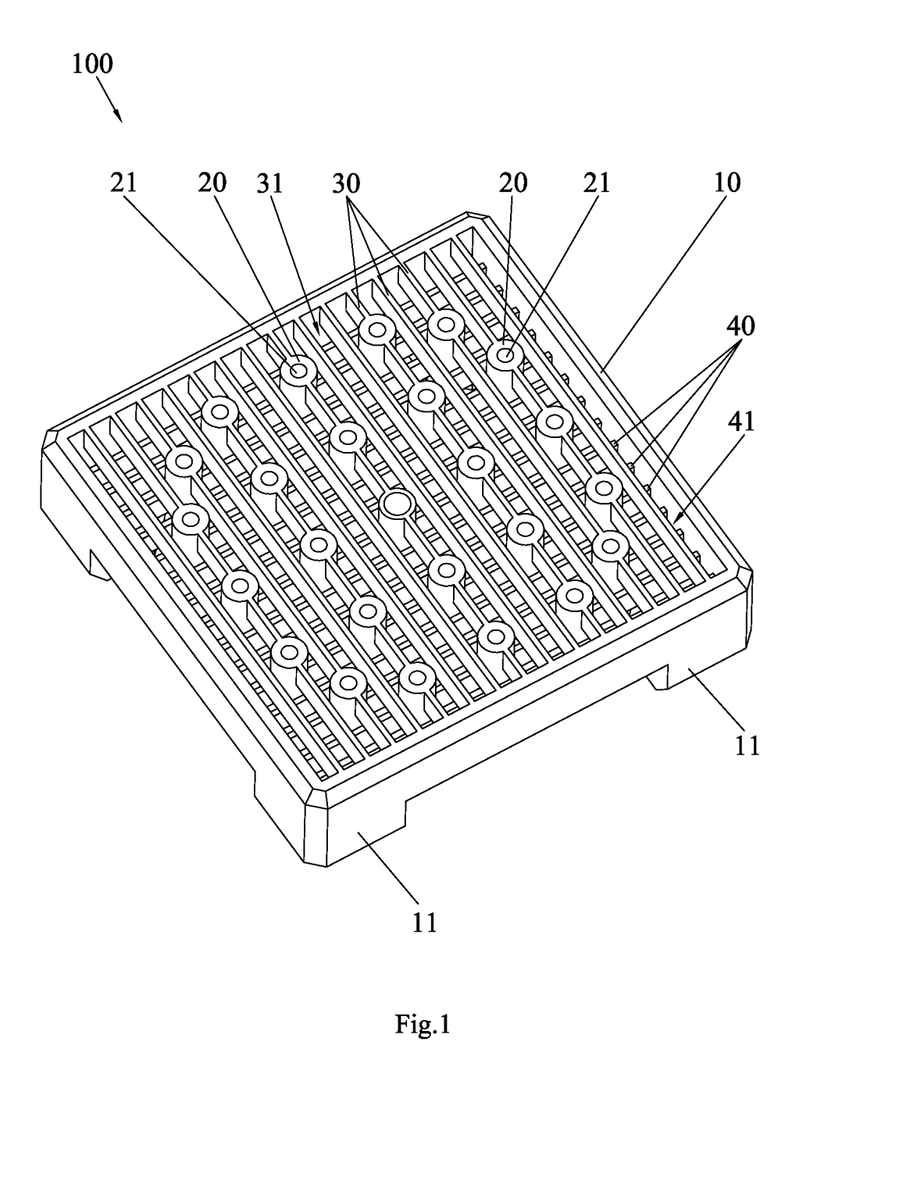
FIG. 1 is a perspective view of a bottom nozzle according to the present invention.
Figure 2:
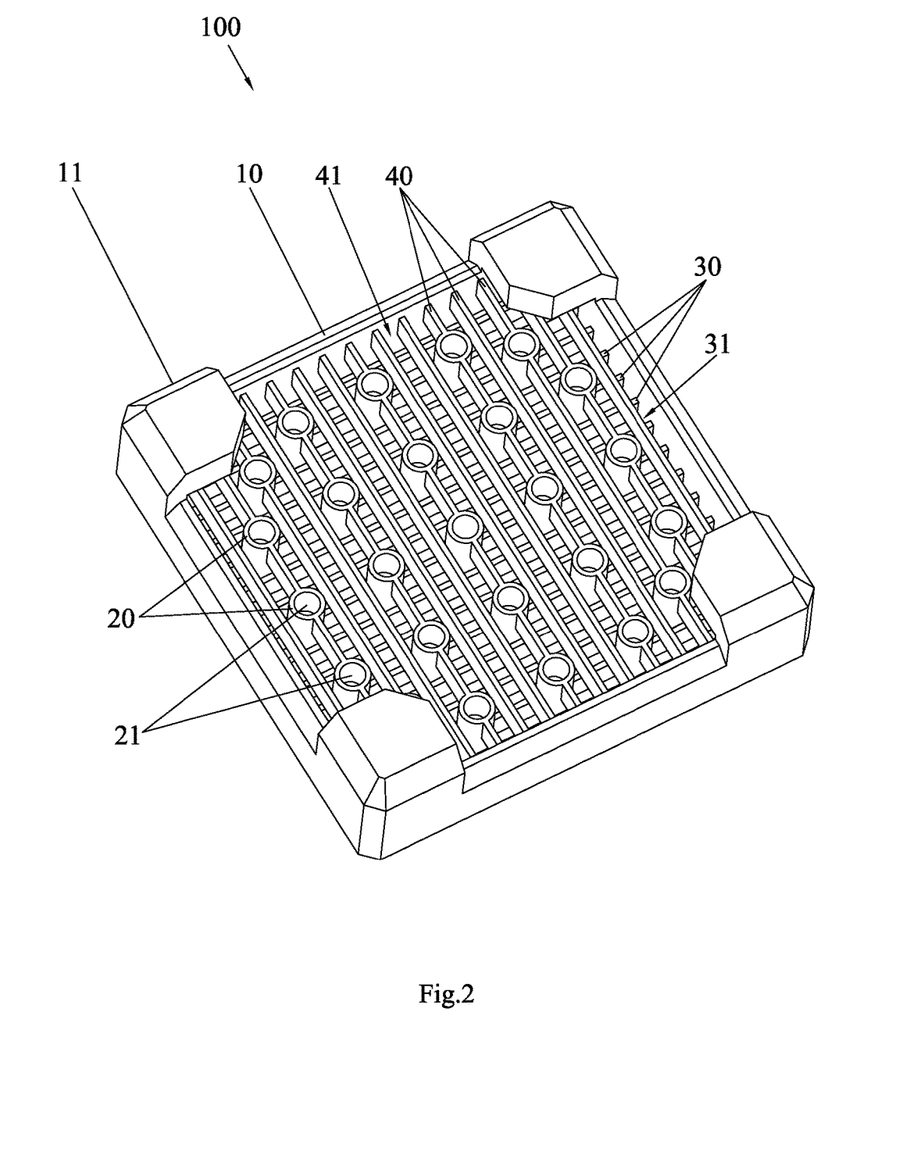
FIG. 2 is another perspective view of the bottom nozzle according to the present invention.

Referring to FIGS. 1 and 2, a bottom nozzle 100 according to the present invention includes a skirt 10, support blocks 20, transverse blades 30 and longitudinal blades 40. The skirt 10 is a hollow structure and a bottom thereof is provided with corner legs 11 which are protruded downwards, a cavity is defined in the hollow structure, the transverse blades 30 are equidistantly and uniformly configured in the cavity to form a transverse thin strip layer, the longitudinal blades 40 are equidistantly and uniformly configured in the cavity to form a longitudinal thin strip layer, both ends of the transverse blades and longitudinal blades are firmly connected with the skirt 10, the transverse blades 30 are located above longitudinal blades 40, projections of the transverse blades 30 and longitudinal blades 40 in a level plane are intersectant to form interleaved grids, and the support blocks 20 run through the transverse blades 30 and longitudinal blades 40, and are firmly connected to the strips 30 and 40. Namely, the upper ends of the support blocks 20 are firmly connected to the transverse blades 30, and lower ends of the support blocks 20 are firmly connected to the longitudinal blades 40. Specifically, each support block 20 has a connecting hole 21 whereby a guide thimble 400 of a light-water reactor fuel assembly 600 is mounted, and the connecting hole 21 is a stepped hole that has a narrow top and a wider bottom. In such a way, the stepped hole facilitates the installation of the guide thimble 400 and the bottom nozzle 100.

Figure 3:
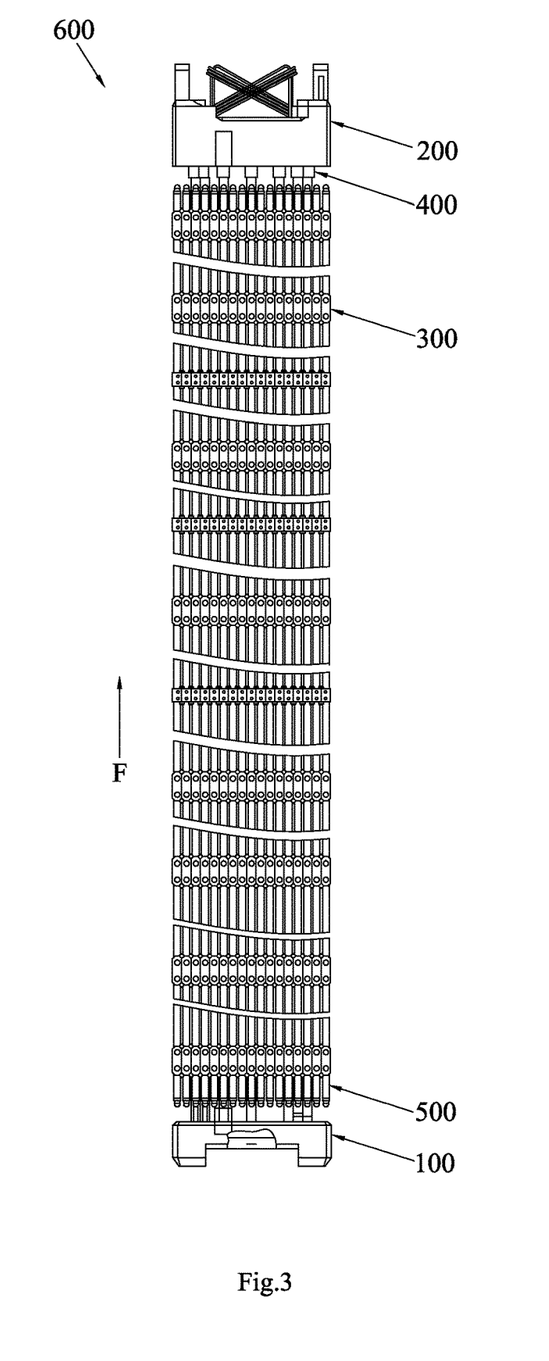
FIG. 3 is a side view of a light-water reactor fuel assembly according to the present invention.

As shown in FIG. 3, a light-water reactor fuel assembly 600 includes a bottom nozzle 100, a top nozzle 200, spacer grids 300, guide thimbles 400 and fuel rods 500, the fuel rods 500 and the guide thimbles 400 are inserted into the spacer grids 300 respectively, the spacer grids 300 have upper ends connected and mating with the top nozzle 200 and lower ends connected and mating with the bottom nozzle 100. The bottom nozzle 100 includes a skirt 10, support blocks 20, transverse blades 30 and longitudinal blades 40. The skirt 10 is a hollow structure and a bottom thereof is provided with corner legs 11 which are protruded downwards, a cavity is defined in the hollow structure, the transverse blades 30 are equidistantly and uniformly configured in the cavity to form a transverse thin strip layer, the longitudinal blades 40 are equidistantly and uniformly configured in the cavity to form a longitudinal thin strip layer, both ends of the transverse blades and longitudinal blades are firmly connected with the skirt 10, the transverse blades 30 are located above longitudinal blades 40, projections of the transverse blades 30 and longitudinal blades 40 in a level plane are intersectant to form interleaved grids, and the support blocks 20 run through and firmly connect to the transverse blades 30 and longitudinal blades 40. Specifically, the support blocks 2 have connecting holes 21 whereby guide thimbles 400 of a light-water reactor fuel assembly 600 are mounted, as shown the arrow F indicates a flowing direction of water in the light-water reactor fuel assembly 600. Following is detailed description of the present invention, by combination with FIG. 4a to FIG. 5c.

Figure 4A:
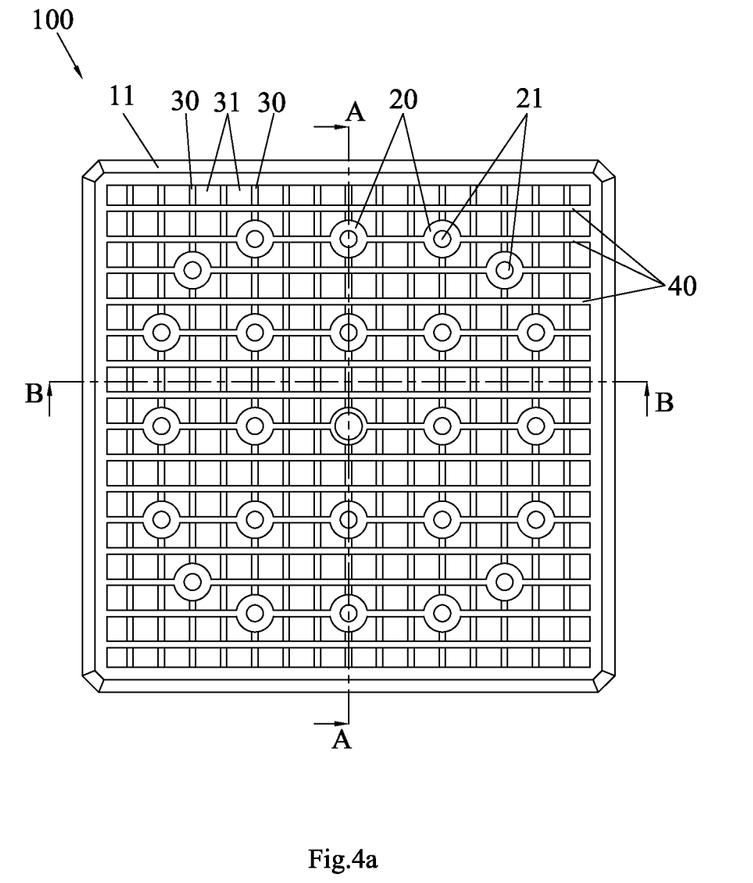
FIG. 4a is a plan view of a bottom nozzle according to a first embodiment of the present invention.
Figure 4B:
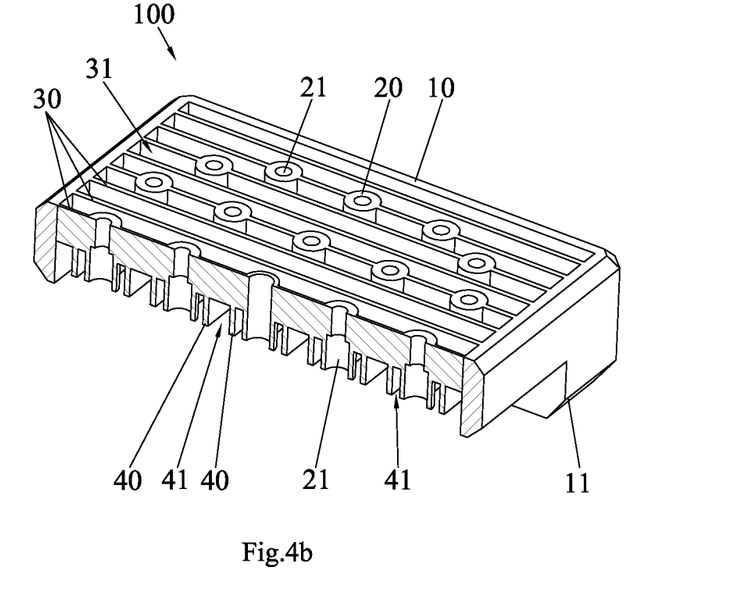
FIG. 4b is a sectional view of FIG. 4a along A-A line.
Figure 4C:
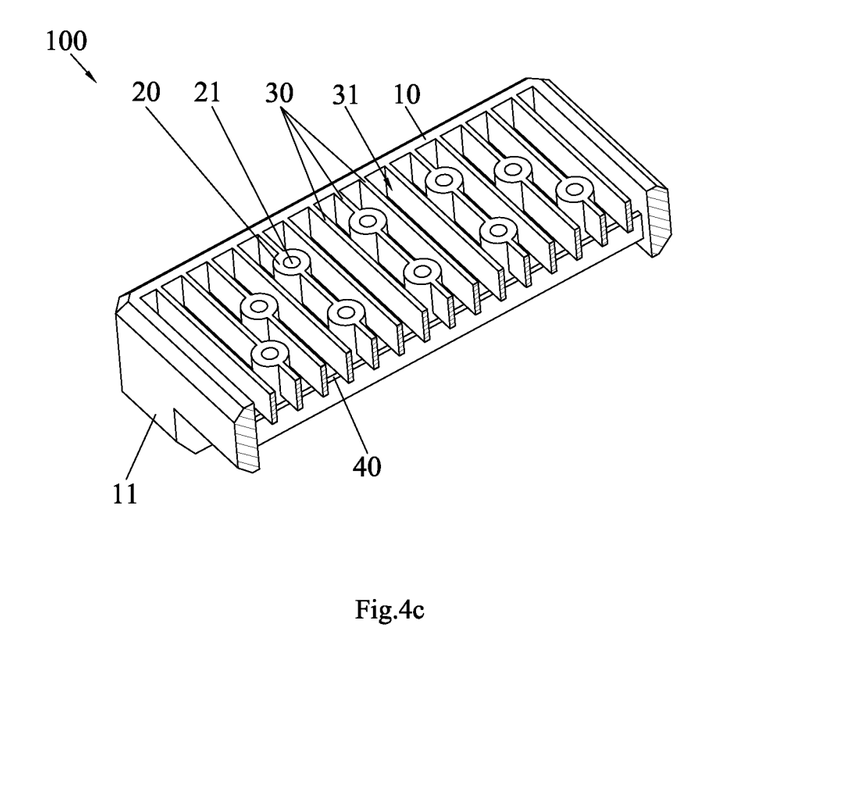
FIG. 4c is a sectional view of FIG. 4a along B-B line.

Preferably, as shown in FIG. 4a to FIG. 4c, since the transverse blades 30 are uniformly arranged in the cavity with the same spacing to form the transverse thin strip layer, the longitudinal blades 40 are uniformly arranged in the cavity with the same spacing to form the longitudinal thin strip layer, both ends of the transverse blades 30 and longitudinal blades 40 are firmly connected with the skirt 10, so that the transverse blades 30 and longitudinal blades 40 are intersectant to form interleaved and three-dimensional grids, thereby the bottom nozzle 100 forms a three-dimensional and gridded water passage, that is longitudinal water passage layers 41 and transverse water passage layers 31. Specifically, the longitudinal thin strip layer is formed by multiple longitudinal blades 40 uniformly arranged, and the spacing between adjacent longitudinal blades 40 forms one of the longitudinal water passage layers 41; similarly, the transverse thin strip layer is formed by multiple transverse blades 30 uniformly arranged, and the spacing between adjacent transverse blades 30 forms one of the transverse water passage layer 31. Both of the longitudinal water passage layers 41 and the transverse water passage layers 31 are shaped as strip grooves, since the both are not in the same plane, but interleaved spatially, thus forming such a three-dimensional and gridded water passage. During the operation, the water flow direction is from down to up (as illustrated by the arrow F in FIG. 3), that is, the water flows from the longitudinal water passage layers 41 to the transverse water passage layers 31, and flows to the spacer grid 300 finally. When water passes through the longitudinal water passage layers 41, the water pressure drop is reduced due to less obstruction presents in the layers 41 (there are only transverse blades 30), so that the water flow will suffer less resistance, the pressure drop becomes small when the water flows through the bottom nozzle 100. In addition, since the transverse blades 30 and longitudinal blades 40 in three-dimensional grids are located in the skirt 10, thereby the support strength of the bottom nozzle 100 are enhanced, and the miming state of the bottom nozzle 100 are stable even it suffers the weight of the spacer grids 300 and the scouring of the high-speed water flow, which ensures the normal and safe running of the nuclear reaction. Meanwhile, the three-dimensional and gridded water passage formed by the transverse blades 30 and longitudinal blades 40 can obstruct the foreign substance in the water flow and make it stay in the longitudinal water passage layers 41, thus no foreign substance flows into the transverse water passage layers 31 and goes into the spacer grids 300 to ensure the normal running. Further, the foreign substance is stayed in the longitudinal water passage layers 41, thus the foreign substance cannot float freely to disturb the normal running.

Figure 5A:
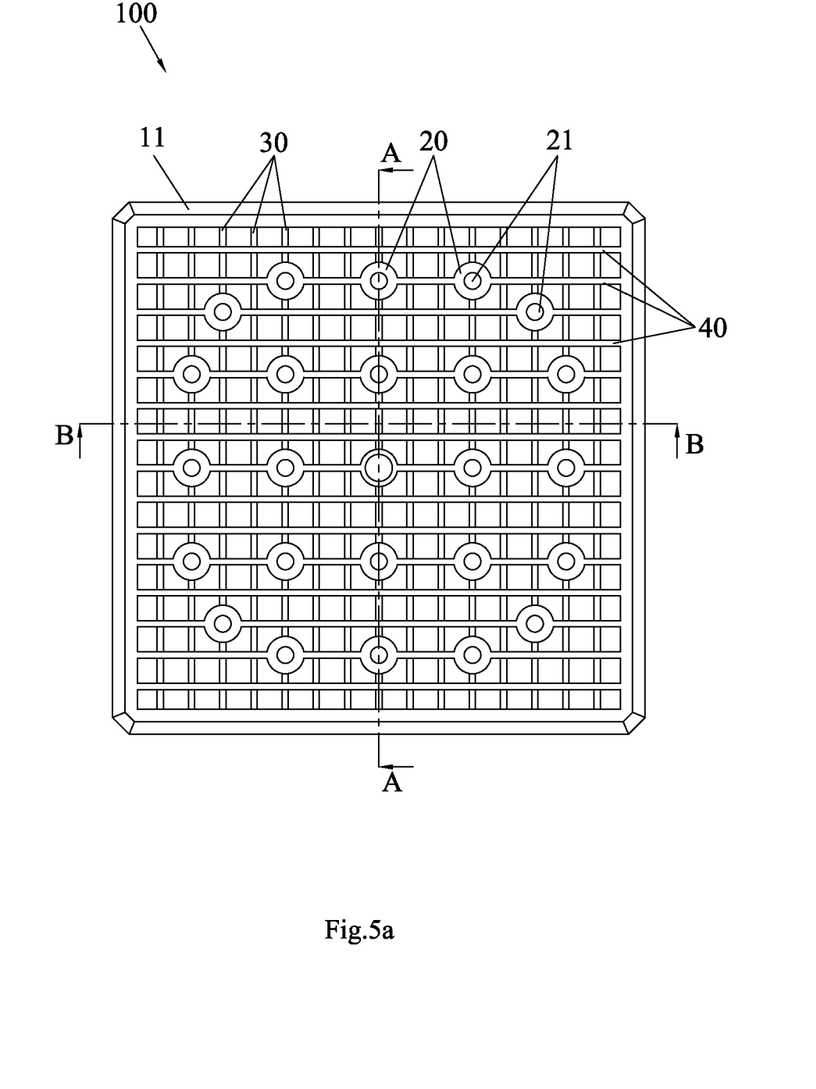
FIG. 5a is a plan view of a bottom nozzle according to a second embodiment of the present invention.
Figure 5B:
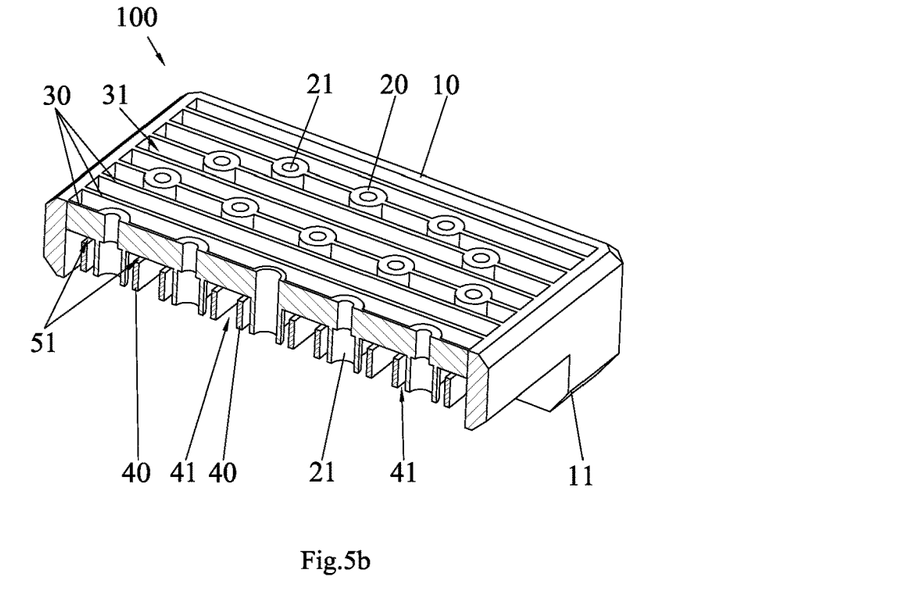
FIG. 5b is a sectional view of FIG. 5a along A-A line.
Figure 5C:
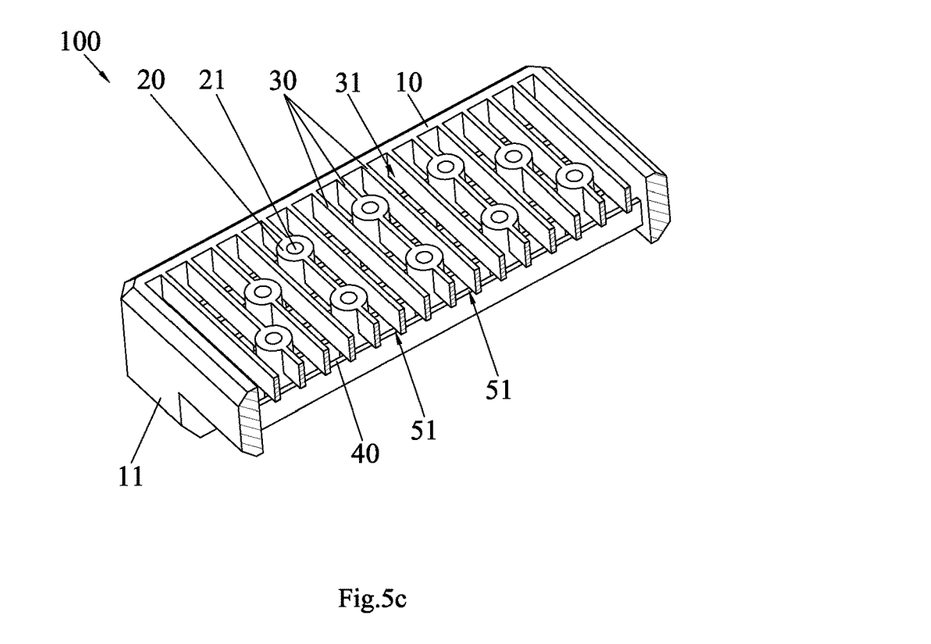
FIG. 5c is a sectional view of FIG. 5a along B-B line.

Preferably, as shown in FIGS. 5a to 5c, a gap is formed between the lower ends of the transverse blades 30 and the upper ends of the longitudinal blades 40 to form a water passage subdivision layer 51, thus the transverse blades 30 and the longitudinal blades 40 are arranged without contact one another, in such a way, a three-layer water passage is formed in the bottom nozzle, the three layers are the longitudinal water passage layers 41, the water passage subdivision layer 51, and the transverse water passage layers 31, from down to up, as shown in arrow F in the FIG. 3. Specifically, multiple longitudinal blades 40 uniformly arranged form the longitudinal blades layer, and the spacing between two adjacent longitudinal blades 40 forms one of the longitudinal water passage layers 41; similarly, multiple transverse blades 30 uniformly arranged form the transverse blades layer, and the spacing between two adjacent transverse blades 30 forms one of the transverse water passage layers 31. Water flow firstly passes through the longitudinal water passage layers 41 to go into the water passage subdivision layer 51, and then goes into the transverse water passage layers 31, finally goes into the spacer grids 300. The three layers of water passage are communicated with each other to improve the filter capacity of the bottom nozzle 100, and the water flow will suffer less resistance so that the pressure drop becomes small when the water flow passes through the bottom nozzle 100. In addition, since the water passage subdivision layer 51 is formed by the gap between the transverse blades 30 and the longitudinal blades 40, namely there is no substance part in the water passage subdivision layer 51, thus the flow of the water through the water passage subdivision layer 51 is smooth without obstruction, thereby greatly reducing the water pressure drop and ensuring the normal running of the nuclear reaction.

Preferably, the support blocks 20 are located at intersections of the grids, to connect the transverse blades 30 with the longitudinal blades 40 to form a unity so as to improve the strength of the bottom nozzle 100, thereby maintaining a stable running state and a normal and safe running when the bottom nozzle 100 suffers the weight of the spacer grids 300 and the scouring of the high-speed water flow.

Preferably, the support blocks 20, the transverse blades 30 and the longitudinal blades 40 are in an integrated structure, thereby simplifying the structure of the bottom nozzle 100 and the light-water reactor fuel assembly 600, and facilitating the manufacture thereof.

Preferably, projections of the transverse blades 30 and longitudinal blades 40 in a level plane are orthogonal, thereby the grips formed by the transverse blades 30 and longitudinal blades 40 are in a three-dimensional square, so as to further improve the filter capacity of the bottom nozzle 100.

Preferably, both ends of the transverse blades 30 and longitudinal blades 40 are firmly and vertically connected with the skirt 10. Alternatively, both ends of the transverse blades 30 and longitudinal blades 40 are firmly connected with the skirt 10, with an angle of 45° therebetween. The angle between the strips and the skirt 10 can be varied to meet the actual demands.

Figure 6:
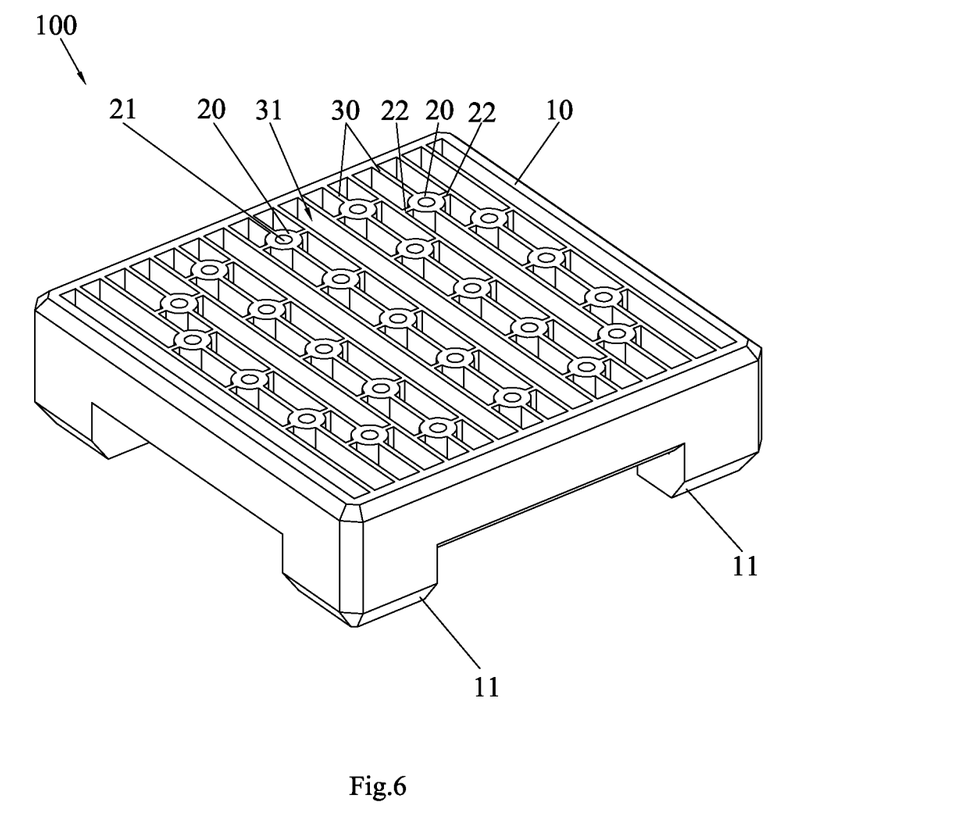
FIG. 6 is a perspective view of a bottom nozzle with an enhanced strip according to the present invention.

As shown in FIG. 6, preferably, an enhanced strip 22 is connected between each support block 20 and its adjacent transverse thin strip 30, or between each support block 20 and its adjacent longitudinal thin strip 40. By means of the enhance strip 22, the three adjacent transverse blades 30 or longitudinal blades 40 are further connected together, so as to further improve the strength of the bottom nozzle 100, thereby maintaining a stable running state and a normal and safe running when the bottom nozzle 100 suffers the weight of the spacer grids 300 and the scouring of the high-speed water flow.

Figure 7A:
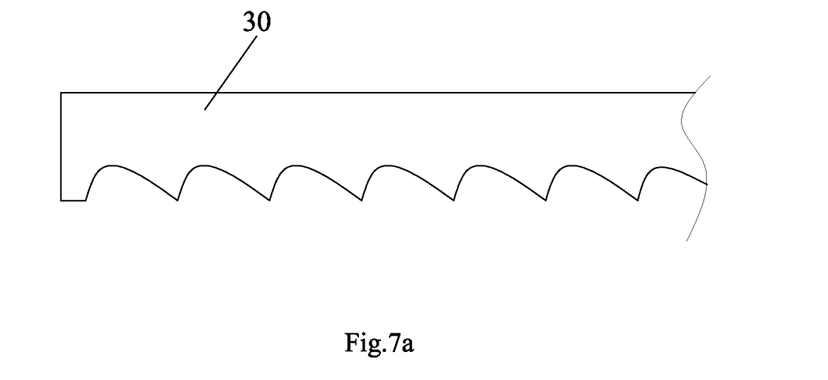
FIG. 7a is a view showing the structure of the transverse thin strip of the bottom nozzle according to the present invention.
Figure 7B:
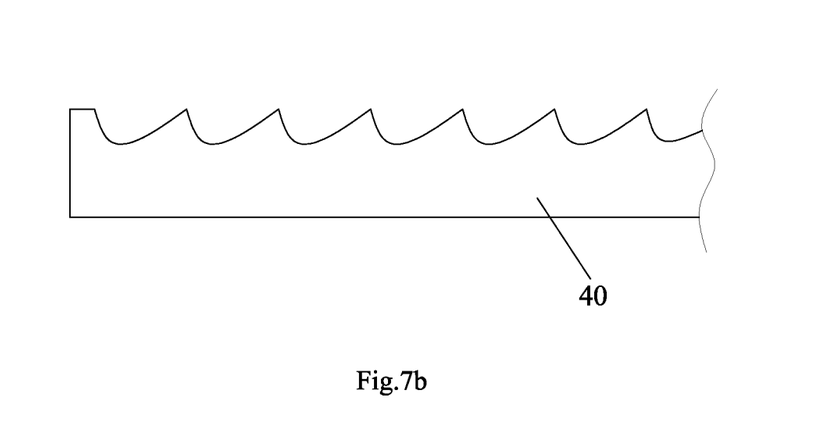
FIG. 7b is a view showing the structure of the longitudinal thin strip of the bottom nozzle according to the present invention.
Figure 7C:
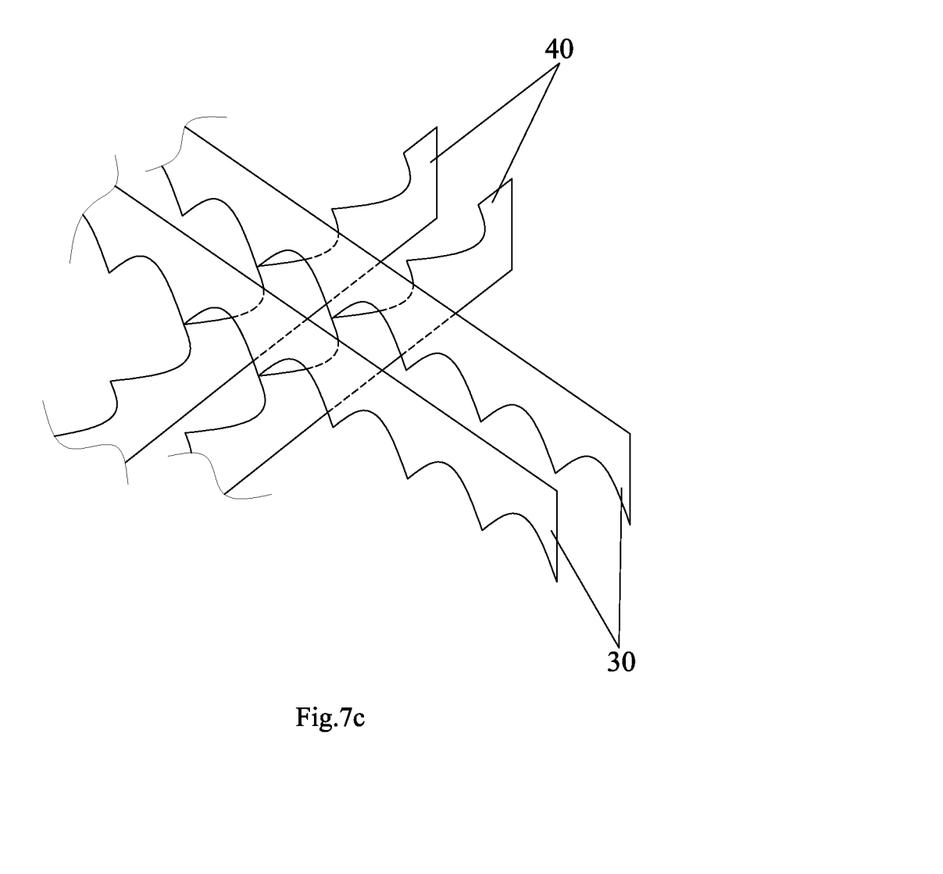
FIG. 7c is a view showing the wave structure of the transverse thin strip and the longitudinal thin strip of the bottom nozzle according to the present invention.

As shown in FIGS. 7a-7c, preferably, the transverse blades 30 and longitudinal blades 40 are in wave structures, and wave crests of the transverse blades 30 are corresponding with wave crests of the longitudinal blades 40. In other words, the wave troughs of the transverse blades 30 are corresponding with wave troughs of the longitudinal blades 40, thus a water passage is formed between the wave troughs, so that the water flow will suffer less resistance, and the pressure drop becomes small when the water flows through the bottom nozzle 100.

By combination with FIGS. 1-7, since the skirt 10 of the bottom nozzle 100 and the light-water reactor fuel assembly 600 is a hollow structure and a bottom of the skirt 10 is provided with corner legs 11 which are protruded downwards, a cavity is defined in the hollow structure, the transverse blades 30 are equidistantly and uniformly configured in the cavity to form a transverse thin strip layer, the longitudinal blades 40 are equidistantly and uniformly configured in the cavity to form a longitudinal thin strip layer, both ends of the transverse blades 30 and longitudinal blades 40 are firmly connected with the skirt 10, the transverse blades 30 are located above longitudinal blades 40, and projections of the transverse blades 30 and the longitudinal blades 40 in a level plane are intersectant to form interleaved grids, so that a three-dimensional and gridded water passage is formed in the bottom nozzle 100, namely the longitudinal water passage layers 41 and the transverse water passage layers 31. Specifically, the longitudinal thin strip layer is formed by multiple longitudinal blades 40 uniformly arranged, and the spacing between adjacent longitudinal blades 40 forms the longitudinal water passage layer 41; similarly, the transverse thin strip layer is formed by multiple transverse blades 30 uniformly arranged, and the spacing between adjacent transverse blades 30 forms the transverse water passage layer 31. Both of the longitudinal water passage layer 41 and the transverse water passage layer 31 are shaped as strip grooves, since the both are not in the same plane, but interleaved spatially, thus forming such a three-dimensional and gridded water passage. The water flows from the longitudinal water passage layers 41 to the transverse water passage layers 31, and flows to the spacer grids 300 finally. When water passes through the longitudinal water passage layers 41, the water pressure drop is reduced due to less obstructions (only transverse blades 30) present in the longitudinal water passage layers 41, so that the water flow will suffer less resistance, the pressure drop becomes small when the water flows through the bottom nozzle 100. In addition, since the transverse blades 30 and longitudinal blades 40 in three-dimensional grids are located in the skirt 10, thereby the support strength of the bottom nozzle 100 are enhanced, and the running state of the bottom nozzle 100 are stable even it suffers the weight of the spacer grids 300 and the scouring of the high-speed water flow, which ensures the normal and safe operation of the nuclear reaction. Meanwhile, the three-dimensional and gridded water passage formed by the transverse blades 30 and longitudinal blades 40 can obstruct the foreign substance in the water flow and make it stay in the longitudinal water passage layers 41, thus no foreign substance flows into the transverse water passage layers 31 and goes into the spacer grids 300 to ensure the normal running. Further, the foreign substance is stayed in the longitudinal water passage layers 41, thus the foreign substance can not float freely to disturb the normal running.

In addition, structures and working principles of the top nozzle 200, the spacer grids 300, the guide thimbles 400, and the fuel rods 500 are well known to persons skilled in the art, which are not described in detail here.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A bottom nozzle of a light-water reactor fuel assembly, comprising a skirt, support blocks, transverse blades and longitudinal blades, wherein the skirt is a hollow structure and a bottom thereof is provided with corner legs which are protruded downwards, a cavity is defined in the hollow structure, the transverse blades are equidistantly and uniformly configured in the cavity to form a transverse thin strip layer, the longitudinal blades are equidistantly and uniformly configured in the cavity to form a longitudinal thin strip layer, both ends of the transverse blades and longitudinal blades are connected with the skirt, the transverse blades are located above longitudinal blades, projections of the transverse blades and the longitudinal blades in a level plane are intersectant to form interleaved grids, and the support blocks run through and are fixed on the transverse blades and the longitudinal blades, wherein a gap is formed between lower ends of the transverse blades and upper ends of the longitudinal blades to form a water passage subdivision layer, and wherein the transverse blades and the longitudinal blades are in wave structures, and the transverse blades and the longitudinal blades are flipped in orientation vertically 180 degrees with respect to each other, such that downward-facing wave crests of the transverse blades are directly above corresponding upward-facing wave crests of the longitudinal blades.

2. The bottom nozzle according to claim 1, wherein lower ends of the transverse blades are connected to upper ends of the longitudinal blades.

3. The bottom nozzle according to claim 1, wherein the support blocks are located at intersections of the grids.

4. The bottom nozzle according to claim 1, wherein the support blocks, the transverse blades and the longitudinal blades are in an integrated structure.

5. The bottom nozzle according to claim 1, wherein projections of the transverse blades and longitudinal blades in a level plane are orthogonal.

6. The bottom nozzle according to claim 1, wherein an enhanced strip is connected between each support block and its adjacent transverse thin strip, or between each support block and its adjacent longitudinal thin strip.

7. The bottom nozzle according to claim 1, wherein the support blocks are provided with connecting holes which are capable of receiving guide thimbles of a light-water reactor fuel assembly, and the connecting holes are stepped holes each of which has a narrow top and a wider bottom.

8. A light-water reactor fuel assembly, comprising a bottom nozzle, a top nozzle, spacer grids, guide thimbles and fuel rods, the fuel rods and the guide thimbles being inserted into the spacer grids respectively, the spacer grids having upper ends connected and mating with the top nozzle and lower ends connected and mating with the bottom nozzle, and the bottom nozzle comprising a skirt, support blocks, transverse blades and longitudinal blades, wherein the skirt is a hollow structure and a bottom thereof is provided with corner legs which are protruded downwards, a cavity is defined in the hollow structure, the transverse blades are equidistantly and uniformly configured in the cavity to form a transverse thin strip layer, the longitudinal blades are equidistantly and uniformly configured in the cavity to form a longitudinal thin strip layer, both ends of the transverse blades and longitudinal blades are connected with the skirt, the transverse blades are located above longitudinal blades, projections of the transverse blades and the longitudinal blades in a level plane are intersectant to form interleaved grids, and the support blocks run through and are fixed on the transverse blades and the longitudinal blades, wherein a gap is formed between lower ends of the transverse blades and upper ends of the longitudinal blades to form a water passage subdivision layer, and wherein the transverse blades and the longitudinal blades are in wave structures, and the transverse blades and the longitudinal blades are flipped in orientation vertically 180 degrees with respect to each other, such that downward-facing wave crests of the transverse blades are directly above corresponding upward-facing wave crests of the longitudinal blades.

9. The light-water reactor fuel assembly according to claim 8, wherein lower ends of the transverse blades are connected to upper ends of the longitudinal blades.

10. The light-water reactor fuel assembly according to claim 8, wherein the support blocks are located at intersections of the grids.

11. The light-water reactor fuel assembly according to claim 8, wherein the support blocks, the transverse blades and the longitudinal blades are in an integrated structure.

12. The light-water reactor fuel assembly according to claim 8, wherein projections of the transverse blades and longitudinal blades in a level plane are orthogonal.

13. The light-water reactor fuel assembly according to claim 8, wherein an enhanced strip is connected between each support block and its adjacent transverse thin strip, or between each support block and its adjacent longitudinal thin strip.

14. The light-water reactor fuel assembly according to claim 8, wherein the support blocks are provided with connecting holes which are capable of receiving guide thimbles of a light-water reactor fuel assembly, and the connecting holes are stepped holes each of which has a narrow top and a wider bottom.

* * * * *